UNITED STATES PATENT OFFICE.

CHARLES C. SHIBER, OF WILKES-BARRÉ, PENNSYLVANIA.

COMPOSITION OF MATTER.

SPECIFICATION forming part of Letters Patent No. 440,066, dated November 4, 1890.

Application filed July 29, 1890. Serial No. 360,305. (No specimens.)

*To all whom it may concern:*

Be it known that I, CHARLES C. SHIBER, a citizen of the United States, residing at Wilkes-Barré, in the county of Luzerne and State of Pennsylvania, have invented a new and useful Composition of Matter, of which the following is a specification.

The invention relates to improvements in compositions for plaster, mortar, cement, artificial stone, and the like.

The object of the present invention is to provide a composition adapted to subserve the purpose of ordinary plaster, mortar, cement, and the like, which composition will be unaffected by the weather and thereby enable building and plastering to be carried on at all seasons, and which will be fire-proof and damp-proof.

My composition consists of the following ingredients, combined in the proportions stated: rosin, one-half once; borax, one-half ounce; sand, eight pounds; cement, four ounces; lime, one-half ounce; plaster, six pounds; hair, one-half ounce; marble-dust, one pound; salt, one-fourth ounce.

The compound is prepared in a dry state and can be transported in bags, in barrels, and the like, and by the addition of water it is prepared for use and can be employed in the place of common mortar, lime-plaster, and becomes dry and hard in about an hour and is not porous when solidified, and it thereby enables buildings to be readily erected at any season and to be immediately occupied without the dangers and delays attendant upon ordinary mortar and lime plaster.

The composition is fire-proof, and by not being porous is damp-proof and prevents damp walls, and is much lighter and more tenacious than mortar and plaster and possesses considerable elasticity.

The composition can be employed where plaster, mortar, artificial stone, and the like are used, and it is susceptible of a high polish, and is adapted to be used in mantels, door and window frames, and the like, and it can be painted, tinted, papered, or marbleized. It being not porous makes it healthful from a sanitary standpoint, as it will not harbor germs of disease.

The composition is capable of being molded for the manufacture of ornaments and moldings of any design and character to fit any part of a building, and is also adapted for cellar-bottoms and the like.

What I claim is—

The herein-described composition of matter, consisting of rosin, borax, sand, cement, lime, plaster, hair, marble-dust, and salt, substantially as described.

In testimony that I claim the foregoing as my own I have hereto affixed my signature in presence of two witnesses.

CHAS. C. SHIBER.

Witnesses:
JOHN J. BECKER,
E. L. MULLIGAN.